United States Patent
Pitetti et al.

[15] 3,671,823
[45] June 20, 1972

[54] THIN FILM CAPACITOR INCLUDING AN ALUMINUM UNDERLAY

[72] Inventors: Raymond Charles Pitetti, Wescosville; Walter Worobey, Center Valley, both of Pa.

[73] Assignee: Bell Telephone Laboratories, Incorporated, Murray Hill, N.J.

[22] Filed: July 1, 1971

[21] Appl. No.: 158,788

[52] U.S. Cl. .............................. 317/258, 317/261, 29/25.42
[51] Int. Cl. ........................................................ H01g 1/01
[58] Field of Search ......................... 317/258, 261; 29/25.42

[56] References Cited

UNITED STATES PATENTS 2,993,266   7/1961   Borry.................................29/25.42

Primary Examiner—E. A. Goldberg
Attorney—R. J. Guenther et al.

[57] ABSTRACT

The use of an aluminum film beneath the tantalum anode of a tantalum thin film capacitor results in a significant enhancement in the frequency response of the capacitor and a lower dissipation factor at frequencies above 10 kilohertz than normally evidenced by devices not including the aluminum film.

6 Claims, 6 Drawing Figures

PATENTED JUN 20 1972    3,671,823

INVENTORS
R. C. PITETTI
W. WOROBEY
BY
ATTORNEY

3,671,823

THIN FILM CAPACITOR INCLUDING AN ALUMINUM UNDERLAY

This invention relates to a technique for the fabrication of a capacitor utilizing a film-forming metal as one of the electrodes, an oxide layer of the film-forming metal produced by anodization as the dielectric, and an electrically conductive counterelectrode, and also relates to capacitors produced by such techniques.

DESCRIPTION OF THE PRIOR ART

There is a group of metals, including tantalum, niobium, titanium, hafnium, and zirconium, whose oxides are known to be excellent dielectric materials which are well suited for use in capacitors. An inherent advantage of the use of such oxides as the dielectric layer in a capacitor is that it is possible to produce the oxide layer by electrically anodizing a body of the pure metal which later is, in turn, utilized as one electrode of the capacitor. The device is conveniently completed by the deposition of a counterelectrode in direct contact with the anodized film.

Although such structures, commonly referred to as thin film capacitors, have attained widespread prominence in the electronics industry, studies have continued with a view toward enhancing frequency response. Studies have revealed that dielectric losses for such devices at 1 kilohertz are typically within the 0.002 to 0.005 range, but increase rapidly at higher frequencies, particularly in excess of 10 kilohertz. At frequencies of the order of 100 kilohertz most capacitance and dissipation factor measurements are terminated, since the losses generally exceed 10 percent. This behavior has been attributed to the series resistance of the device which is related directly to the high resistance of the noted metals. Accordingly, it has been found that the standard thin film capacitor can be most effectively used as a high frequency capacitor when the contribution of electrode resistances is reduced.

SUMMARY OF THE INVENTION

In accordance with the present invention, this end is conveniently attained by a novel processing sequence which involves depositing an aluminum underlay upon the capacitor substrate prior to the deposition thereon of a base electrode. Devices produced in accordance with the described technique manifest a markedly improved frequency response, lower series resistance, and lower dissipation factors at high frequencies than prior art structures which did not include the aluminum underlay, as described herein.

BRIEF DESCRIPTION OF THE DRAWING

The invention will be more fully understood by reference to the following detailed description taken in conjunction with the drawing wherein.

DETAILED DESCRIPTION OF THE INVENTION

Figure 1:
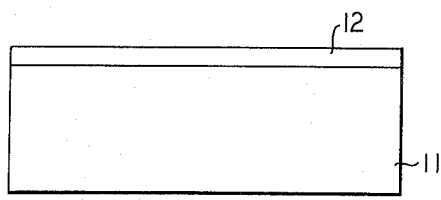
FIG. 1 is a cross-sectional view of a substrate member upon which a thin layer of aluminum has been deposited in accordance with the present invention.

With further reference now to FIG. 1, there is shown a substrate 11 upon which a layer of aluminum 12 has been deposited. The substrate selected for use in the practice of the present invention should desirably be able to withstand temperatures ranging as high as 400° Centigrade, since they may be subjected to such temperatures during the deposition stage of the processing. Preferred substrate materials for this purpose are glasses, glazed ceramics, etc.

Prior to deposition of the aluminum layer 12, the substrate is cleansed by conventional techniques well known to those skilled in the art. Then, aluminum layer 12 is deposited upon the substrate by conventional vacuum evaporation techniques as described by L. Holland in "Vacuum Deposition of Thin Films," J. Wiley and Sons, New York, 1956. Although numerous deposition techniques are known in the art, studies having revealed that adherent aluminum films of high conductivity are obtained most advantageously by vacuum evaporation procedures upon substrate members heated to temperatures of the order of 350° Centigrade. A suitable alternative for attaining this end involves the use of a bonding medium intermediate the substrate and the aluminum, titanium being found to be particularly well suited for this purpose. Deposition of the titanium may conveniently be effected at room temperature in the apparatus employed for the aluminum deposition, a thickness of 400 Angstroms being found acceptable for bonding purposes.

For the purposes of the present invention, the minimum thickness of the deposited aluminum film is not critical but should be of sufficient thickness to uniformly cover the surface of the substrate. A thickness of the order of 3,000 Angstroms has been found to be acceptable for the purposes intended in the present invention. There is no upper limit of film thickness dictated by considerations of the described process.

Figure 2:
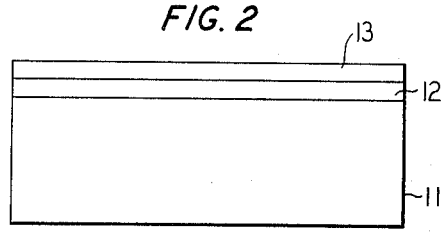
FIG. 2 is a cross-sectional view of the structure shown in FIG. 1 after the deposition thereon of a layer of a film-forming metal.

The next step in the inventive process involves depositing the base electrode 13 (FIG. 2) of the capacitor upon the aluminum layer by conventional condensation techniques, such as cathodic sputtering, vacuum evaporation, and the like. The minimum thickness of layer 13 is dependent upon two factors. The first of these is the thickness of the metal which is converted into the oxide form during the subsequent anodizing step. The second factor is the minimum thickness of unoxidized metal remaining after anodization commensurate with the maximum resistance which can be tolerated in the film-forming metal electrode. It has been determined that the preferred minimum thickness of the metal base electrode is approximately 1,000 Angstroms. There is no maximum limit on this thickness, although little advantage is gained by the increase above 10,000 Angstroms. For anodizing voltages up to 250 volts, it has been determined that a metal deposit of at least 4,000 Angstroms is preferred. It is considered that, of this 4,000 Angstroms, a maximum of approximately 2,000 Angstroms is converted during the anodizing step, leaving approximately 2,000 Angstroms as the electrode thickness.

As indicated previously, the film-forming metals suitable for use in the practice of the present invention are tantalum, niobium, hafnium, titanium, and zirconium. With respect to tantalum, either low density tantalum having a density less than 16 grams per cubic centimeter (obtained by sputtering tantalum at voltages ranging from 800 to 2,500 volts and partial pressures of sputtering gases ranging from 10 to 100 microns of mercury) or normal density tantalum may be used.

Figure 3:
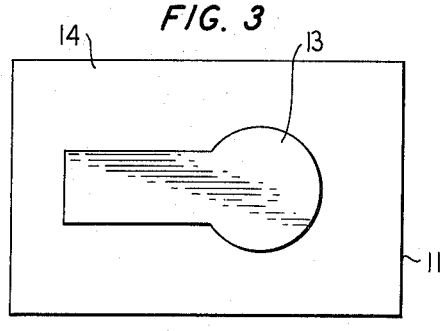
FIG. 3 is a plan view of the structure of FIG. 2 after it has been subjected to photolithographic processing to delineate a desired pattern.

Following, photoengraving of a desired pattern of film-forming layer 13 is effected so as to completely remove certain portions thereof. Any of the well-known conventional procedures may be used to effect this result, except that the etchant must be suitable, for the metal and for the metals mentioned above will normally contain hydrofluoric acid or other fluorides. Shown in FIG. 3 is the substrate 11 with a desired pattern in layer 13. Numeral 14 represents the areas from which film-forming metal was removed by the photoengraving process.

Figure 4:
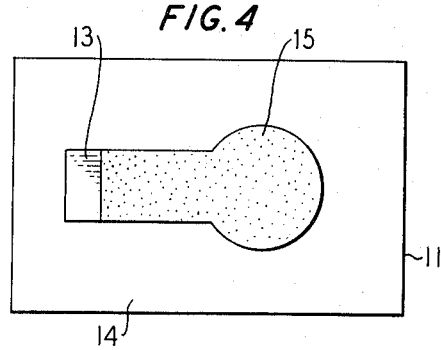
FIG. 4 is a plan view of the structure of FIG. 3 after partial anodization of the film-forming metal.

Following, layer 13 is partially anodized to form an oxide dielectric layer 15 (FIG. 4) thereon. The voltage at which the anodizing is conducted is primarily determined by the voltage at which the capacitors are to be operated. The usual procedure that is followed is similar to conventional anodizing processes in which a low voltage is applied initially and increased so as to maintain a constant anodizing current. Examples of suitable low conductivity electrolytes used for this purpose are oxalic acid, citric acid, tartaric acid, and the like.

Figure 5:
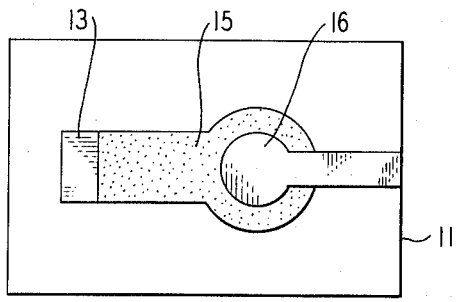
FIG. 5 is a plan view of the structure of FIG. 4 after the deposition thereon of a counterelectrode.

The next step in the fabrication of a capacitor in accordance with the present invention is the application of a counterelectrode in contact with dielectric oxide film. Any suitable method for producing an electrically conductive layer 16 (FIG. 5) on the surface of the oxide layer is suitable, provided it does not mechanically or thermally disturb the oxide layer. Vacuum evaporation is especially suited for this purpose, metals such as "Nichrome" and gold being conveniently employed. After the deposition of counterelectrode material, a counterelectrode pattern is defined by conventional photoengraving techniques.

In the processing procedure described heretofore, it may be advantageous to employ a heat treatment step subsequent to anodization for the purpose of thermally stressing the dielectric to expose potential defect areas followed by a reanodization step for the purpose of anodically oxidizing any defect areas which may have occurred during the thermal stress and then electrode deposition.

An example of the present invention is described in detail below. The example is included merely to aid in the understanding of the invention, and variations may be made by one skilled in the art without departing from the spirit and scope of the invention.

EXAMPLE

This example describes the production of a capacitor employing tantalum as the film-forming base metal electrode.

A 1-inch by 3-inch glass microscope slide was employed as the substrate and cleaned with ultrasonic detergent washes and boiling hydrogen peroxide in accordance with conventional techniques. Thereafter, the cleansed substrate was placed in a vacuum evaporation chamber and a layer of aluminum (greater than 99.99 per cent purity) 3,000 Angstroms in thickness was evaporated at a pressure of $5 \times 10^{-6}$ torr upon a substrate heated to a temperature of 350° Centigrade. Following, a layer of tantalum 2,000 Angstroms in thickness was deposited upon the aluminum layer in a sputtering chamber at 1,500 volts and a current density of 0.33 milliamperes per square centimeter. Then, a suitable capacitor pattern was generated in the tantalum layer by conventional photoengraving procedures utilizing a photoresist and an etchant comprising 30 percent sodium hydroxide. Then, the tantalum film was anodized in a 3.0 percent aqueous solution of tartaric acid buffered to a pH of 5.5 using ammonium hydroxide until a voltage of 130 volts was attained. Next, the assembly was inserted in an evaporation chamber, and 200 Angstroms of "Nichrome" and 4,000 Angstroms of gold evaporated thereon as the counterelectrode through a mechanical mask at a pressure of $5 \times 10^{-5}$ torr.

The above-described procedure was repeated, with the exception that a normal density beta tantalum film was deposited upon the aluminum layer by sputtering tantalum at 5,000 volts at a current density of 250 milliamperes. For comparative purposes, this procedure was repeated in the absence of the aluminum film. After concluding the fabrication procedures, the electrical characteristics of the various devices were determined by conventional measuring techniques well known by those skilled in the art.

Figure 6:
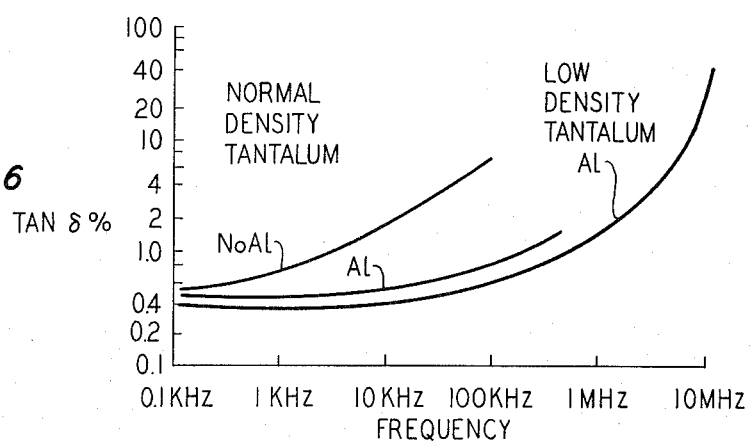
FIG. 6 is a graphical representation on coordinates of frequency in hertz against dissipation factor in per cent showing the dependence of the dissipation factor on frequency for low density tantalum capacitors having an aluminum underlay beneath the base electrode and for normal density tantalum both with and without an aluminum underlay beneath the base electrode.

The dependence of dissipation factor upon frequency for the low density tantalum capacitors with an aluminum underlay and for normal density tantalum with and without the aluminum underlay was then determined by plotting frequency in hertz against dissipation factor in per cent (FIG. 6). The capacitors tested all had capacitance values of the order of 10,000 picofarads. It was noted that the dielectric losses of normal density tantalum capacitors without an aluminum underlay continued to rise from 0.1 kilohertz up to 100 kilohertz. However, the use of beta tantalum with an aluminum underlay as the anode resulted in substantially constant losses from 0.1 kilohertz to 100 kilohertz. Above this frequency, the losses increase because of series resistance. The curve for low density tantalum with an aluminum underlay is substantially parallel to the normal density tantalum including the aluminum underlay. Capacitance values for both low and high density tantalum with the aluminum underlay were found to remain substantially constant up to frequency values beyond 100 kilohertz.

What is claimed is:

1. Thin film capacitor including a substrate member having deposited thereon a layer of a film-forming metal selected from the group consisting of tantalum, niobium, hafnium, zirconium, and titanium, and oxide layer of said film-forming metal and a counterelectrode, CHARACTERIZED IN THAT a layer of aluminum is deposited beneath said film-forming metal and is in intimate contact therewith.

2. Capacitor in accordance with claim 1 wherein said film-forming metal is tantalum.

3. Technique for the fabrication of a thin film capacitor comprising the steps of (a) depositing a layer of a film-forming metal selected from the group consisting of tantalum, niobium, hafnium, zirconium, and titanium upon a substrate member; (b) generating a desired pattern in said film-forming metal by photoengraving techniques; (c) partially anodizing the resultant film-forming metal; and (d) depositing a counterelectrode, CHARACTERIZED IN THAT a layer of aluminum is deposited upon said substrate prior to the deposition thereon of said film-forming metal.

4. Technique in accordance with claim 3 wherein said aluminum is deposited by vacuum evaporation techniques.

5. Technique in accordance with claim 4 wherein said substrate is heated to a temperature of the order of 350° Centigrade during the deposition of aluminum thereon.

6. Technique in accordance with claim 4 wherein said film-forming metal is tantalum.

* * * * *